Feb. 14, 1933.  F. SCHRÖTER  1,897,219
APPARATUS FOR PHOTOELECTRIC EXPLORATION BY REFLECTION
METHOD IN COPYING AND PICTURE TELEGRAPHY
Filed Jan. 31, 1929

Inventor
FRITZ SCHRÖTER
By his Attorney

Patented Feb. 14, 1933

1,897,219

UNITED STATES PATENT OFFICE

FRITZ SCHRÖTER, OF BERLIN, GERMANY, ASSIGNOR TO TELEFUNKEN GESELLSCHAFT FÜR DRAHTLOSE TELEGRAPHIE M. B. H., BERLIN, GERMANY, A CORPORATION OF GERMANY

APPARATUS FOR PHOTOELECTRIC EXPLORATION BY REFLECTION METHOD IN COPYING AND PICTURE TELEGRAPHY

Application filed January 31, 1929, Serial No. 336,344, and in Germany February 8, 1928.

The present invention relates to a highly efficient photoelectric exploration system for use particularly in copying or picture telegraphy. In accordance with this invention the reflection method is used, and it is by this means that the original picture or telegram may be directly transmitted, even when the operating speed is very high.

A primary object of this invention is to illuminate a spot on the picture surface and to provide a system and means whereby it is possible to concentrate the maximum amount of reflected light from the picture surface, when the reflected light varies in accordance with the tone intensity upon each elemental area of the picture, upon the photo cell for illumination thereof.

Other objects of this invention will become apparent from a reading of the following specification when considered together with the accompanying drawing and hereinafter appended claims.

The essential features of the invention are shown by the accompanying drawing, wherein:

Fig. 1 shows the light reflection from a picture surface according to the ordinarily used schemes;

Fig. 2 conventionally illustrates a system in accordance with this invention for increasing the amount of reflected light which will be reflected to the photo cell;

Figs. 3—a and 3—b illustrate the manner by which the curvature of the reflecting body is determined;

For photoelectric exploration of a picture surface it is customary to successively illuminate by means of a sharp focus or luminous spot having the size of an elemental area, unit, or element of the picture. In these schemes mechanisms are provided for driving the drum carrying the picture so that different parts or elemental areas of the surface to be transmitted are consecutively illuminated or struck by the focus.

Figure 1:
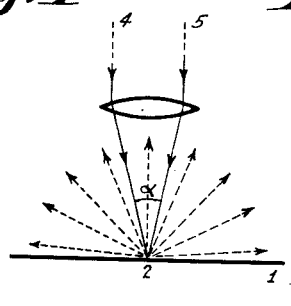

Owing to the diffuse reflection of ordinary grades of paper, the rays will be uniformly scattered in all directions at the point where the luminous spot impinges upon the surface. The reflection from the particular spot or area is bright or light in accordance with the tone or intensity of light and shade on the picture at the particular point. This is shown by Fig. 1 where 1 represents the picture surface, 2 the focus, i. e., the apex of a cone or pencil of light rays having an aperture $\alpha$ and being produced, for instance, by the objective 3. The impinging rays for which arrow-head lines 4 and 5 indicate the direction and limitation are reflected in all directions diffusively from the picture surface 2, this being shown by dash-line arrows having a direction opposed to that of the impinging rays.

Now, the essential feature of the invention resides in that the point of impinging of the rays 2, which may be regarded as the origin or source of radiation diverging in all directions is made the focus of a reflecting body or solid of rotation whose generatrix has a cone section of the same shape or preferably deformed in shape.

Figure 2:
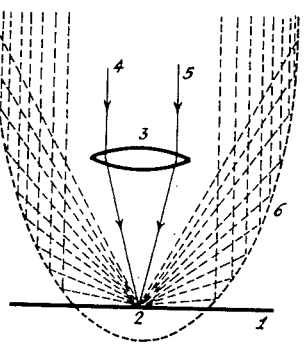

Referring to Fig. 2, the origin 2 of the reflected rays is conceived to be located in a paraboloid of rotation 6 whose boundaries are indicated by the dash-lines. Of course, the part located below the picture surface is not actually existent, and the paraboloid is imagined to be supplemented. The absence of this lower part is of no practical importance since the diffusion of the light on the picture surface is confined to the upper hemisphere, inasmuch as practically no light passes across or through the paper. It will be seen from Fig. 2 that, in accordance with the known properties of a paraboloid of rotation, if the reflector is of sufficient dimensions, the major portion of the rays diffusing from 2 reaches the reflecting wall whence it is reflected in rays parallel to the axis. It will further be seen that the rays are concentrated tubularly, and that in the axis of the paraboloid there remains an open channel through which the exploring light may be conveniently passed.

Figure 3:
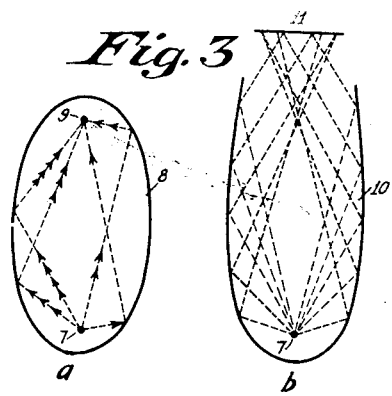

If the arrangement according to Fig. 3—a were to be carried into effect in such a way that the diffusion point 2 is located in the focus 7 of a reflecting ellipsoid of rotation 8, then, in conformity with a well-known law, all of the rays emerging from 7 would be thrown in the conjugate focus 9, as illustrated in the Fig. 3—a for a number of arbitrarily chosen rays marked by arrows with differ- numbers of heads. Hence, if 7 were identical with the diffusion point 2, Fig. 2, and if in the focus 9 there were mounted a small photoelectric cell, the latter would collect all of the rays issuing from 7 and thus utilize the same to modulate a transmitter.

Inasmuch as it has heretofore not been feasible to build photoelectric cells of extremely small proportions and in a way corresponding to Fig. 3—a, the body of rotation 10, according to Fig. 3—b, is given the shape of a slightly deformed ellipsoid of rotation. The course of the rays issuing from point 7 is then such that the far largest part thereof strikes the surface 11 in diffuse condition. A sensitized layer of a photoelectric or selenium cell may be supposed to occupy the surface designated 11.

Figure 4:
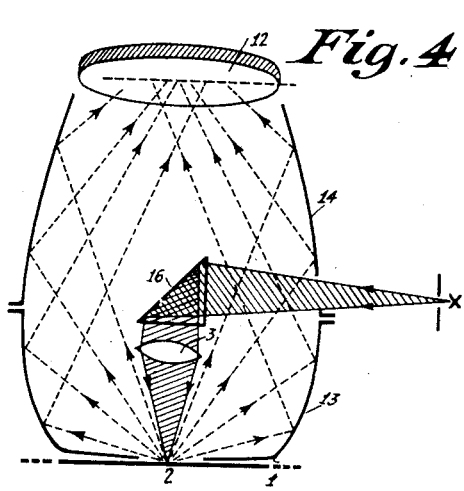
Fig. 4 illustrates a form of reflector particularly suited to use with my system.
Figure 5:
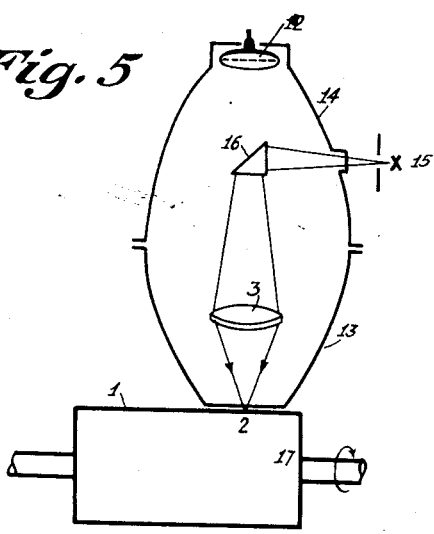
Fig. 5 illustrates a modification of the system shown by Fig. 4.

Embodiments of the basic idea of the invention according to the facts hereinbefore outlined are illustrated in Figs. 4 and 5 by way of example, although it will be understood that there are conceivable a great number of modifications as regards dimensions and details of arrangement. Therefore, only the fundamental principles of the apparatus are shown here.

Referring to Fig. 4, 1 denotes again the surface of the picture or the like to be explored and placed, for instance, upon a picture drum. Focus 2 is supplied from a luminous source 15 which, by the aid of a deflector prism 16 and an objective 3 is thrown in outline upon 2.

The pencil of rays passes through a lateral opening of the reflecting body of rotation as clearly shown in the illustration. The size of the light source and of its image may be limited by the aid of a diaphragm in front of which a perforated disk may be made to revolve, for the purpose of producing a carrier frequency. The reflected rays are again indicated by dash-lines, whereas the impinging pencil of light rays is indicated by the shading. Inside a large solid angle, these reflected rays reach the reflecting inside wall of the reflector without suffering losses owing to optical absorption, refraction, diffusion or the like causes, and from where they are thrown upon the photoelectric cell. Since such reflecting bodies of rotation are usually made by pressing and stamping of metal sheet, the space is suitably composed of the two parts 13 and 14. It is closed metallically as far as feasible in the neighborhood of the picture drum in order to shield the photoelectric cell in electrical regard.

The embodiment shown in Fig. 5 makes it clear that to work in accordance with the invention, comparatively small photoelectric cells 12 may be employed. In this figure parts being fundamentally the same are designated by the same numerals as in Fig. 4. 17 denotes the picture drum. The body of reflection has roughly the shape of an ellipsoid, though also a combination comprising an ellipsoid or paraboloid of rotation and a cylindrical or conical appendage are possible. The dimensions could be substantially diminished if the optical supply means (denoted by parts 3 and 16) screening off part of the reflected rays are properly and judiciously designed, so that no unhandy systems are obtained.

The inside wall of the reflecting bodies as shown can be rendered highly reflective by silvering and polishing so that coefficients of reflection as high as 0.96 to 0.98 can be obtained; the result is that one or even two reflections will involve practically no loss.

Figure 6:
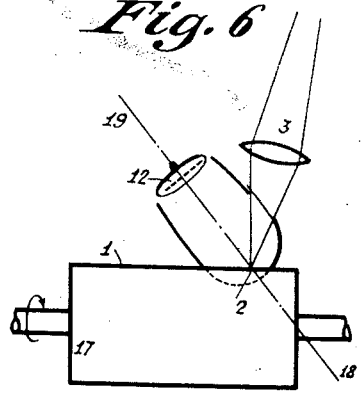
Fig. 6 is a further modification showing the reflecting body so arranged that its axis is inclined with respect to the picture surface.

It is not necessary that the axis of the reflecting hollow body should be normal to the surface of the picture or the like, indeed, it may occupy an angular oblique or slanting position with respect thereto, and also with respect to the impinging light pencil. Looked at from a constructional viewpoint, this may offer an advantage and may be conducive to the saving of considerable space for the assembly of the apparatus. An arrangement of this sort in which the same numerals for denotation are used, is shown in Fig. 6. Line 18—19 indicates the axial position of the reflecting hollow body.

Any suitable means may be employed for obtaining a relative movement between the picture carrying drum and the illumination system. For example, I may employ a rotary drum which will turn the picture with it and as it turns will advance the same in a spiral path beneath the focus point 2, or I may move the light system by an appropriate reciprocating mechanism so that it travels longitudinally of the picture drum 17 and arrange the drum 17 so as to rotate one picture line width at the end of each longitudinal movement of the lighting and scanning system.

Various changes and modifications of the system herein disclosed will at once suggest themselves to those skilled in the art to which this invention relates, and I, therefore, believe myself entitled to make any desired changes or modifications which may be found suitable, in so far as such changes fall fairly within the spirit and scope of the invention.

Having now described my invention, what I claim is:

1. In a picture reproducing system, a picture support, a pick-up device comprising a source of light, a photo cell, means for concentrating the light from said source upon a spot on the picture, a zone of a paraboloid of revolution having its apex on the side of said support opposite said pick-up device and the focus point at said spot for forming a light guiding means receiving a major part of the light diffusely reflected from said spot and directing it to said photo cell and means for causing relative motion between said picture support and said pick-up device whereby the said spot is caused to explore the picture.

2. In a picture transmission device, a picture support, a pick-up device comprising a source of light, a photo cell, means for concentrating the light from said source upon a spot on the picture, a zone of a paraboloid of revolution adjacent said support for collecting substantially the entire amount of light diffusely reflected therefrom upon illumination and directing said light to the photo cell, and means for causing relative motion between said picture support and said pick-up device, whereby the said spot is caused to explore the picture.

3. A reflector for light diffusely reflected from a spot on a surface comprising a mirror, the reflecting area of said mirror being a zone of a paraboloid of revolution having its axis normal to said surface and its focus at said spot, the apex of the paraboloid being on the side of said surface opposite said mirror.

4. Means for optically exploring a surface comprising a mirror, the reflecting area of said mirror being a zone of a paraboloid of revolution having its axis normal to said surface and its focus in said surface, the apex of the paraboloid being on the side of said surface opposite said mirror, a source of light, means for concentrating the light from said source into a convergent beam coaxial with said zone and having its focus at the focus of said paraboloid, and means for moving said surface relative to said mirror whereby the focus of mirror and beam shall travel in said surface.

5. An optical system for analyzing surfaces for facsimile transmission including a reflecting surface in the form of a zone of a paraboloid or revolution having its apex on the side of said surface opposite said reflecting surface, a source of light, means for concentrating the light from said source at a point on said surface corresponding to the focus of said paraboloid of revolution, and a photo cell associated with said paraboloid and arranged to receive substantially the entire amount of light diffusely reflected from said surface as reflected by said paraboloid.

6. In a picture transmission system, a surface capable of diffusely reflecting light, a parabolic light reflector adjacent said surface, said reflector having a lateral aperture, means for introducing light rays from an external source through said aperture and directing the same as a point source upon said surface, and means provided by said reflector for reflecting rays from said surface in an axial direction with respect thereto.

7. A facsimile transmission system including a picture support and a pick-up device comprising a source of light, a photo cell, means for concentrating the light from said source as a point on said picture surface, and a paraboloid of revolution adjacent said picture surface for forming a reflecting body for directing substantially the entire amount of reflected light rays therefrom to said photo cell.

8. In a picture transmission system, a picture support, a parabolic reflecting surface adjacent thereto, means for directing light from an external source through said parabolic reflector and concentrating the same at a point on said picture surface corresponding to the focus of said parabolic reflector, and means provided by said parabolic reflector for directing substantially the entire amount of diffusely reflected light from said picture in a direction axially with respect thereto, and a photoelectric cell associated with said parabolic reflector for receiving the light reflected from said picture surface.

9. In a picture transmission system, a picture support, a reflecting solid of revolution adjacent thereto and inclined at an angle with respect thereto, means for directing light from an external source through said reflector and concentrating the same as a point source on said surface, said point corresponding to the focus of said solid of revolution, and means provided by said solid of revolution for reflecting substantially the entire amount of light reflected from said picture in a predetermined direction.

10. In a picture transmission system, a picture support, a reflecting solid of revolution adjacent thereto, means for directing light from an external source through said reflector and concentrating the same as a point source on said surface, said point corresponding to the focus of said solid of revolution, and means provided by said solid of revolution for reflecting substantially the entire amount of light reflected from said picture in a predetermined direction.

FRITZ SCHRÖTER.